US012742980B2

(12) United States Patent
Fernandez et al.

(10) Patent No.: US 12,742,980 B2
(45) Date of Patent: Sep. 22, 2026

(54) CIRCADIAN RHYTHM RESTORING BLUE BLOCKERS

(71) Applicant: Arizona Board of Regents on Behalf of the University of Arizona, Tucson, AZ (US)

(72) Inventors: Fabian Fernandez, Tucson, AZ (US); Michael Grandner, Tucson, AZ (US); Brooke Alexander, Tucson, AZ (US); Stanley K. H. Pau, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 173 days.

(21) Appl. No.: 18/292,292

(22) PCT Filed: Jul. 25, 2022

(86) PCT No.: PCT/US2022/038207
§ 371 (c)(1),
(2) Date: Jan. 25, 2024

(87) PCT Pub. No.: WO2023/009448
PCT Pub. Date: Feb. 2, 2023

(65) Prior Publication Data

US 2025/0093684 A1 Mar. 20, 2025

Related U.S. Application Data

(60) Provisional application No. 63/225,727, filed on Jul. 26, 2021.

(51) Int. Cl.
*G02C 7/10* (2006.01)
*G02B 5/28* (2006.01)

(52) U.S. Cl.
CPC ............. *G02C 7/104* (2013.01); *G02B 5/285* (2013.01)

(58) Field of Classification Search
None
See application file for complete search history.

(56) References Cited

U.S. PATENT DOCUMENTS 4,320,939 A 3/1982 Mueller
5,646,781 A 7/1997 Johnson, Jr.
(Continued)

FOREIGN PATENT DOCUMENTS

EP 1519771 B9 9/2010
WO 2017210498 A1 12/2017
(Continued)

OTHER PUBLICATIONS

Adaikkan, Chinnakkaruppan, et al., "Gamma Entrainment Binds Higher-Order Brain Regions and Offers Neuroprotection," Neuron 2019;102(5):929-943 e928.
(Continued)

*Primary Examiner* — Robert E. Tallman
(74) *Attorney, Agent, or Firm* — Ashurst Perkins Coie US LLP

(57) ABSTRACT

Methods and devices are described that relate to spectral filters and associated eyewear that are specifically designed to mitigate the disruptive effects of electric lighting on the circadian clock that can cause sleep deprivation and other physiological and psychological maladies. An example wearable device for viewing a real or virtual environment includes one or more windows positioned and a spectral filter that comprises a coating positioned on one or more sections of the one or more windows. The spectral filter includes a multi-layer stack of dielectric material with alternate high and low indices of refraction. The number of
(Continued)

the layers and a thickness of each layer are selected to provide designed transmission and blocking characteristics to block circadian-rhythm-disruptive spectra from reaching the wearer's eyes while providing viewability of the real or virtual environment by allowing light outside of the circadian-rhythm-disruptive spectra to reach the wearer's eyes.

21 Claims, 9 Drawing Sheets

(56) References Cited

U.S. PATENT DOCUMENTS

| | | | | |
|---|---|---|---|---|
| 10,857,382 | B2 | 12/2020 | Ibrahim et al. | |
| 10,962,789 | B1 | 3/2021 | Lewis | |
| 11,607,557 | B2 | 3/2023 | Ibrahim et al. | |
| 11,809,025 | B2 | 11/2023 | Wu et al. | |
| 11,940,675 | B2 | 3/2024 | Schmeder | |
| 12,019,316 | B2 | 6/2024 | Marck et al. | |
| 12,085,788 | B2 | 9/2024 | Saylor et al. | |
| 12,474,600 | B2 | 11/2025 | Sheehan et al. | |
| 2008/0139941 | A1 | 6/2008 | Njemanze | |
| 2012/0250166 | A1 | 10/2012 | Idei et al. | |
| 2012/0253429 | A1 | 10/2012 | Schiffer | |
| 2014/0233105 | A1* | 8/2014 | Schmeder | G02B 5/201 359/590 |
| 2014/0277291 | A1 | 9/2014 | Pugh et al. | |
| 2014/0277292 | A1 | 9/2014 | Steel | |
| 2015/0146166 | A1 | 5/2015 | Weber et al. | |
| 2015/0192800 | A1 | 7/2015 | Dirk et al. | |
| 2015/0238774 | A1 | 8/2015 | Anderson et al. | |
| 2016/0077361 | A1* | 3/2016 | Wold | G02C 7/104 351/44 |
| 2017/0192255 | A1 | 7/2017 | Santan et al. | |
| 2017/0274221 | A1 | 9/2017 | Barrau et al. | |
| 2017/0336545 | A1 | 11/2017 | Blair et al. | |
| 2017/0363884 | A1* | 12/2017 | Hallock | A62B 18/082 |
| 2018/0177976 | A1 | 6/2018 | Burstein | |
| 2018/0239170 | A1 | 8/2018 | Barrau et al. | |
| 2018/0264284 | A1 | 9/2018 | Alvarez et al. | |
| 2019/0160304 | A1* | 5/2019 | Ibrahim | A61P 29/00 |
| 2019/0255350 | A1 | 8/2019 | Malchano et al. | |
| 2019/0324179 | A1* | 10/2019 | Thyagarajan | G02B 1/00 |
| 2020/0114117 | A1 | 4/2020 | Burstein | |
| 2020/0264341 | A1 | 8/2020 | Ogo et al. | |
| 2021/0060355 | A1 | 3/2021 | Ibrahim et al. | |
| 2024/0345422 | A1 | 10/2024 | Mason et al. | |
| 2024/0369856 | A1 | 11/2024 | Mason et al. | |
| 2024/0377656 | A1 | 11/2024 | Fernandez et al. | |
| 2025/0093683 | A1 | 3/2025 | Fernandez et al. | |

FOREIGN PATENT DOCUMENTS

| | | | |
|---|---|---|---|
| WO | 2020237352 | A1 | 12/2020 |
| WO | 2021026218 | A2 | 2/2021 |
| WO | 2021096840 | A1 | 5/2021 |
| WO | 2022204137 | A1 | 9/2022 |
| WO | 2023009448 | A1 | 2/2023 |
| WO | 2023009451 | A1 | 2/2023 |
| WO | 2023009454 | A1 | 2/2023 |
| WO | 2023009460 | A1 | 2/2023 |
| WO | 2023009462 | A1 | 2/2023 |
| WO | 2023141629 | A2 | 7/2023 |

OTHER PUBLICATIONS

Ahmadi, S., et al., "ATP-sensitive Potassium Channels and L-type Calcium Channels are Involved in Morphine-induced Hyperalgesia after Nociceptive Sensitization in Mice" Basic Clin Neurosci. 2014, Summer;5(3): 191-8.

Alam, Azeem, et al., "Surgery, neuroinflammation and cognitive impairment," EBioMedicine 2018;37:547-556.

Alford, DP., "Opioid Prescribing for Chronic Pain—Achieving the Right Balance through Education", N Engl J Med. Jan. 28, 2016;374(4):301-3.

Allen, Amy L., et al., "Estrogen increases nociception-evoked brain-derived neurotrophic factor gene expression in the female rat," Neuroendocrinology 2005;81(3):193-199.

Andersen, Kenneth Geving, et al., "Persistent pain after breast cancer treatment: a critical review of risk factors and strategies for prevention," J Pain 2011;12(7):725-746.

Andersson, D., et al., "Methylglyoxal evokes pain by stimulating TRPA1", PLoS One. Oct. 22, 2013;8(10):e77986.

Arcuri, Cataldo, et al., "The Pathophysiological Role of Microglia in Dynamic Surveillance, Phagocytosis and Structural Remodeling of the Developing CNS," Front Mol Neurosci 2017;10:191.

Ashburner, Michael, et al., "Gene ontology: tool for the unification of biology", The Gene Ontology Consortium. Nat Genet 2000;25(1):25-29.

Aubrun, Frederic, et al., "The elderly patient and postoperative pain treatment," Best Pract Res Clin Anaesthesiol 2007;21(1):109-127.

Banik, Ratan K., et al., "Sensitization of primary afferents to mechanical and heat stimuli after incision in a novel in vitro mouse glabrous skin-nerve preparation," Pain 2008;138(2):380-391.

Barrientos, Ruth M., et al., "Intracisternal interleukin-1 receptor antagonist prevents postoperative cognitive decline and neuroinflammatory response in aged rats," J Neurosci 2012;32(42):14641-14648.

Bastien, Dominic, et al., "Cytokine pathways regulating glial and leukocyte function after spinal cord and peripheral nerve injury," Exp Neurol 2014;258:62-77.

Bayer, K, et al., "Gabapentin may inhibit synaptic transmission in the mouse spinal cord dorsal horn through a preferential block of P/Q-type Ca2+ channels", Neuropharmacology. Apr. 2004;46(5):743-9.

Benyamin, Ramsin, et al., "Opioid complications and side effects," Pain Physician 2008;11(2 Suppl):S105-120.

Blair, N., et al., "Roles of tetrodotoxin (TTX)-sensitive Na+ current, TTX-resistant Na+ current, and Ca2+ current in the action potentials of nociceptive sensory neurons", J of Neuroscience: official j of society for neuroscience 22(23):10277-10290, 2002.

Blake, H, et al., "Prescribing opioid analgesics for chronic nonmalignant pain in general practice—a survey of attitudes and practice", Br J Pain. Nov. 2015;9(4):225-32.

Boada, M. Danilo, et al., "Skin incision-induced receptive field responses of mechanosensitive peripheral neurons are developmentally regulated in the rat," J Neurophysiol 2012;108(4):1122-1129.

Bodnar, RJ, et al.,"Reversal of stress-induced analgesia by apomorphine, but not by amphetamine", Pharmacol Biochem Behav. Aug. 1980; 13(2): 171-5.

Bonafe, Luisa, et al., "Peripheral osteolysis in adults linked to ASAH1 (acid ceramidase) mutations: A new presentation of Farber disease". Arthritis Rheumatol 2016.

Bourinet, E, et al., "T-type calcium channels in neuropathic pain". Pain. Feb. 2016;157 Suppl 1:S15-22.

Brennan, Timothy J., et al., "Mechanisms of incisional pain," Anesthesiol Clin North Am 2005;23(1):1-20.

Brittain, Joel M., et al., "Suppression of inflammatory and neuropathic pain by uncoupling CRMP-2 from the presynaptic Ca(2)(+) channel complex", Nature medicine 2011;17(7):822-829.

Bromander, Sara, et al., "Changes in serum and cerebrospinal fluid cytokines in response to non-neurological surgery: an observational study," J Neuroinflammation 2012;9:242.

Bruguerolle, Bernard, et al., "Rhythmic pattern in pain and their chronotherapy," Adv Drug Deliv Rev 2007;59(9-10):883-895.

Butler, RK, et al., "Stress-induced analgesia", Prag Neurobiol. Jul. 2009;88(3): 184-202.

Carvalho, CM, et al., "Wavelength effect in temporomandibular joint pain: a clinical experience", Lasers Med Sci. Mar. 2010;25(2):229-32.

Chao, C. C., et al., "Tumor necrosis factor-alpha potentiates glutamate neurotoxicity in human fetal brain cell cultures," Dev Neurosci 1994;16(3-4):172-179.

Chaplan, S.R., et al., "Quantitative assessment of tactile allodynia in the rat paw," J Neurosci Methods 1994;53(1):55-63.

(56) References Cited

OTHER PUBLICATIONS

Chaplan, SR, et al., "Role of voltage-dependent calcium channel subtypes in experimental tactile allodynia", J Pharmacol Exp Ther. Jun. 1994;269(3): 1117-23.
Chen, Gang, et al., "Microglia in Pain: Detrimental and Protective Roles in Pathogenesis and Resolution of Pain," Neuron 2018;100(6):1292-1311.
Chen, Yanxia, et al., "The prolactin receptor long isoform regulates nociceptor sensitization and opioid-induced hyperalgesia selectively in females," Sci Transl Med 2020;12(529).
Cheriyedath, Susha, "SARS-CoV-2 activates microglia in the brain," Jan. 2022.
Chipkin, Richard E., et al., "Potentiation of [D-ala2]enkephalinamide analgesia in rats by thiorphan", European journal of pharmacology 1982;83(3-4):283-288.
Choe, Wonjoo, et al., "TTA-P2 is a potent and selective blocker of T-type calcium channels in rat sensory neurons and a novel antinociceptive agent", Molecular pharmacology 2011;80(5):900-910.
Chung, Hae Young, et al., "Redefining Chronic Inflammation in Aging and Age-Related Diseases: Proposal of the Senoinflammation Concept," Aging Dis 2019;10(2):367-382.
Cidral-Filho, FJ, et al., "Light-emitting diode therapy induces analgesia and decreases spinal cord and sciatic nerve tumour necrosis factor-a levels after sciatic nerve crush in mice", Eur J Pain. Sep. 2013; 17(8): 1193-204.
Cidral-Filho, FJ, et al., "Light-emitting diode therapy induces analgesia in a mouse model of postoperative pain through activation of peripheral opioid receptors and the L-arginine/nitric oxide pathway", Lasers Med Sci. Mar. 2014;29(2):695-702.
Colameco, S, et al., "Continuous opioid treatment for chronic noncancer pain: a time for moderation in prescribing", Postgrad Med. Jul. 2009; 121 (4):61-6.
Coluzzi, Flaminia, et al., "The challenge of perioperative pain management in opioid-tolerant patients," Ther Clin Risk Manag 2017;13:1163-1173.
Coultrap, Steven J., et al., "Autonomous CaMKII mediates both LTP and LTD using a mechanism for differential substrate site selection," Cell Rep 2014;6(3):431-437.
Damaj, MI, et al., "Involvement of calcium and L-type channels in nicotine-induced antinociception", J Pharmacol Exp Ther. Sep. 1993;266(3): 1330-8.
Davis, Benjamin M., et al., "Characterizing microglia activation: a spatial statistics approach to maximize information extraction," Sci Rep 2017;7(1):1576.
De Rossi, P., et al., "A critical role for VEGF and VEGFR2 in NMDA receptor synaptic function and fear-related behavior," Mol Psychiatry 2016;21(12):1768-1780.
Dedek, Annemarie, et al., "Loss of STEP61 couples disinhibition to N-methyl-d-aspartate receptor potentiation in rodent and human spinal pain processing," Brain 2019;142(6):1535-1546.
Ding, Honglu, et al., "BDNF promotes activation of astrocytes and microglia contributing to neuroinflammation and mechanical allodynia in cyclophosphamide-induced cystitis," J Neuroinflammation 2020;17(1):19.
Dogrul, A, et al., "The role of T-type calcium channels in morphine analgesia, development of antinociceptive tolerance and dependence to morphine, and morphine abstinence syndrome", Life Sci. Jun. 28, 2002;71 (6):725-34.
Dustrude, Erik T., et al., "CRMP2 protein SUMOylation modulates NaV1.7 channel trafficking", The Journal of biological chemistry 2013;288(34):24316-24331.
Eastman, CI, et al., "Bright light treatment of winter depression: a placebo-controlled trial", Arch Gen Psychiatry. Oct. 1998;55(10):883-9.
Eisenach, James C., et al., "Pain after surgery," Pain 2018;159(6):1010-1011.
Fang, Li, et al., "Calcium-calmodulin-dependent protein kinase II contributes to spinal cord central sensitization," J Neurosci 2002;22(10):4196-4204.
Fang, Li, et al., "Protein kinases regulate the phosphorylation of the GluR1 subunit of AMPA receptors of spinal cord in rats following noxious stimulation," Brain Res Mol Brain Res 2003;118(1-2):160-165.
Feng, Zhong-Ping, et al., "Residue Gly1326 of the N-type calcium channel alpha 1B subunit controls reversibility of omega-conotoxin GVIA and MVIIA block", The Journal of biological chemistry 2001;276(19):15728-10 15735.
Figuerio, MG, et al., "Tailored lighting intervention improves measures of sleep, depression, and agitation in persons with Alzheimer's disease and related dementia living in long-term care facilities", Clin Interv Aging. Sep. 12, 2014;9:1527-37.
Fricova, Jitka, et al., "The influence of preemptive analgesia on postoperative analgesia and its objective evaluation", Arch Med Sci 2010;6(5):764-771.
Galan, Alba, et al., "In vivo recruitment by painful stimuli of AMPA receptor subunits to the plasma membrane of spinal cord neurons," Pain 2004;112(3):315-323.
Gan, Tong J., "Poorly controlled postoperative pain: prevalence, consequences, and prevention," J Pain Res 2017;10:2287-2298.
Garza, Kristie M., et al., "Gamma Visual Stimulation Induces a Neuroimmune Signaling Profile Distinct from Acute Neuroinflammation," J Neurosci 2020;40(6):1211-1225.
Gelbard, H.A., et al., "Neurotoxic effects of tumor necrosis factor alpha in primary human neuronal cultures are mediated by activation of the glutamate AMPA receptor subtype: implications for AIDS neuropathogenesis," Dev Neurosci 1993;15(6):417-422.
Gilron, Ian, et al., "Effects of the 2-amino-3-hydroxy-5-methyl-4-isoxazole-proprionic acid/kainate antagonist LY293558 on spontaneous and evoked postoperative pain," Clin Pharmacol Ther 2000;68(3):320-327.
Golden, RN, et al., "The efficacy of light therapy in the treatment of mood disorders: a review and meta-analysis of the evidence", Am J Psychiatry. Apr. 2005; 162(4):656-62.
Gomaa, AA., "Characteristics of analgesia induced by adenosine triphosphate", Pharmacol Toxicol. Sep. 1987;61 (3): 199-202.
Gray, Douglas, et al., "Comparative analysis of suicide, accidental, and undetermined cause of death classification", Suicide & life-threatening behavior 2014;44(3):304-316.
Gulur, Padma, et al., "Opioid Sparing Potential of Light-induced Analgesia: A Pilot Trial of a Novel, Non-pharmacological Treatment for Pain," The Anesthesiology Annual Meeting 2020.
Gungor, D., et al., "Pain in adult patients with Pompe disease: a cross-sectional survey", Mol Genet Metab 2013;109(4):371-376.
Hall, Margaret J., et al., "Ambulatory Surgery Data From Hospitals and Ambulatory Surgery Centers: United States, 2010," Natl Health Stat Report 2017(102):1-15.
Hanisch, Uwe-Karsten, "Microglia as a source and target of cytokines," Glia 2002;40(2):140-155.
Hargreaves, K., et al., "A new and sensitive method for measuring thermal nociception in cutaneous hyperalgesia", Pain 1988;32(1):77-88.
Hassett, Afton L., et al., "The risk of suicide mortality in chronic pain patients", Current pain and headache reports 2014;18(8):436.
Hatakeyama, S, et al., "Differential nociceptive responses in mice lacking the alpha(1B) subunit of N-type Ca(2+) channels", Neuroreport. Aug. 8, 2001; 12(11):2423-7.
Heinke, B, et al., "Multiple targets of μ-opioid receptor-mediated presynaptic inhibition at primary afferent Aδ- and C-fibers", J Neurosci. Jan. 26, 2011;31(4):1313-22.
Hestehave, Sara, et al., "The analgesic efficacy of morphine varies with rat strain and experimental pain model: implications for target validation efforts in pain drug discovery," Eur J Pain 2019;23(3):539-554.
Hildebrand, Michael E., et al., "GluN2B and GluN2D NMDARs dominate synaptic responses in the adult spinal cord," Sci Rep 2014;4:4094.
Hildebrand, Michael E., et al., "Potentiation of Synaptic GluN2B NMDAR Currents by Fyn Kinase Is Gated through BDNF-Mediated Disinhibition in Spinal Pain Processing," Cell Rep 2016;17(10):2753-2765.

(56) References Cited

OTHER PUBLICATIONS

Hoogland, Inge C.M., et al., "Systemic inflammation and microglial activation: systematic review of animal experiments," J Neuroinflammation 2015;12:114.
Hooley, Jill M., et al., "Chronic pain and suicide: understanding the association", Current pain and headache reports 2014;18(8):435.
Hough, LB, et al., "H3 receptors and pain modulation: peripheral, spinal, and brain interactions", J Pharmacol Exp Ther. Jan. 2011;336(1):30-7.
Hovens, Iris B., et al., "Postoperative cognitive dysfunction and microglial activation in associated brain regions in old rats," Neurobiol Learn Mem 2015;118:74-79.
Hsieh, RL, et al., "Short-term therapeutic effects of 890-nanometer light therapy for chronic low back pain: a double-blind randomized placebo-controlled study", Lasers Med Sci. Mar. 2014;29(2):671-9.
Huie, J. Russell, et al., "AMPA Receptor Phosphorylation and Synaptic Colocalization on Motor Neurons Drive Maladaptive Plasticity below Complete Spinal Cord Injury," eNeuro 2015;2(5).
Hwang, Boo-Young, et al., "Gender differences in paclitaxel-induced neuropathic pain behavior and analgesic response in rats," Korean J Anesthesiol 2012;62(1):66-72.
Hwang, Min Ho, et al., "Low Level Light Therapy Modulates Inflammatory Mediators Secreted by Human Annulus Fibrosus Cells during Intervertebral Disc Degeneration In Vitro", Photochemistry and photobiology 2015;91(2):403-410.
Hymel, Kristen A., et al., "Modulation of Opioid Analgesic Reward by Inflammatory Agents," Neuropathology of Drug Addictions and Substance Misuse, vol. 3: Elsevier, 2016. pp. 545-554.
Ibrahim, Mohab M., et al., "Long-lasting antinociceptive effects of green light in acute and chronic pain in rats," Pain 2017;158(2):347-360.
Institute of Medicine (U.S.). Committee on Advancing Pain Research Care and Education. "Relieving pain in America : a blueprint for transforming prevention, care, education, and research". Washington, D.C.: National Academies Press, 2011.
International Search Report & Written Opinion mailed on Oct. 26, 2022 for International Patent Application No. PCT/US22/38215 (14 pages).
International Search Report and Written Opinion for International Patent Application No. PCT/US22/38233 (14 pages).
International Search Report and Written Opinion mailed Jun. 30, 2022 for International Patent Application No. PCT/US2022/021336.
International Search Report and Written Opinion mailed Oct. 25, 2022 for International Patent Application No. PCT/US22/38207.
International Search Report and Written Opinion mailed Oct. 25, 2022 for International Patent Application No. PCT/US22/38220 (14 pages).
International Search Report and Written Opinion mailed Oct. 25, 2022 for International Patent Application No. PCT/US22/38235 (14 pages).
Ioannidis, Aristidis, et al., "The Length of Surgical Skin Incision in Postoperative Inflammatory Reaction," JSLS 2018;22(4).
Jack, MM, et al., "Protection from diabetes-induced peripheral sensory neuropathy—a role for elevated glyoxalase I?", Exp Neural. Mar. 2012;234(1 ):62-9.
Ji, Ru-Rong, et al., "Central sensitization and LTP: do pain and memory share similar mechanisms?" Trends Neurosci 2003;26(12):696-705.
Katz, RJ, et al., "Stress induced grooming in the rat—an endorphin mediated syndrome", Neurosci Lett. Jul. 1979; 13(2):209-12.
Kerr, LM, et al., "Autoradiographic localization of calcium channels with [125l]omega-conotoxin in rat brain", Eur J Pharmacol. Jan. 27, 1988;146(1):181-3.
Khanna, Rajesh, et al., "Development and Characterization of an Injury-free Model of Functional Pain in Rats by Exposure to Red Light," J Pain 2019.
Kim, Dong-Sun, et al., "Differentially expressed genes in rat dorsal root ganglia following peripheral nerve injury", Neuroreport 2001;12(15):3401-3405.
Kim, Kwang Jin, et al., "Comparison of three rodent neuropathic pain models", Experimental brain research Experimentelle Hirnforschung Experimentation cerebrale 1997;113(2):200-206.
Koh, Jae Chul, et al., "Postoperative Pain and Intravenous Patient-Controlled Analgesia-Related Adverse Effects in Young and Elderly Patients: A Retrospective Analysis of 10,575 Patients," Medicine (Baltimore) 2015;94(45):e2008.
Kress, M., et al., "N- and L- but not P/Q-type calcium channels contribute to neuropeptide release from rat skin in vitro". Neuroreport 2001;12(4):867-870.
Lascelles, B.D.X., et al., Central sensitization as a result of surgical pain: investigation of the pre-emptive value of pethidine for ovariohysterectomy in the rat, Pain 1995;62(2):201-212.
Latremoliere, Alban, et al., "Central sensitization: a generator of pain hypersensitivity by central neural plasticity," J Pain 2009;10(9):895-926.
Lee, Hae-Jin, et al., "The effect of the AMPA/kainate receptor antagonist LY293558 in a rat model of postoperative pain," J Pain 2006;7(10):768-777.
Lee, Hey-Kyoung, et al., "Regulation of distinct AMPA receptor phosphorylation sites during bidirectional synaptic plasticity," Nature 2000;405(6789):955-959.
Lee, Hey-Kyoung, et al., "Specific roles of AMPA receptor subunit GluR1 (GluA1) phosphorylation sites in regulating synaptic plasticity in the CA1 region of hippocampus," J Neurophysiol 2010;103(1):479-489.
Leichtfried, V, et al., "Short-term effects of bright light therapy in adults with chronic nonspecific back pain: a randomized controlled trial", Pain Med. Dec. 2014;15(12):2003-12.
Levinson, Daniel M. and Sheridan, Charles L., "Assessment of the contact eye cover as an effective method of restricting visual input", Behavior Research Methods & Instrumentation 1978;10(3):376-388.
Lewis, James W., et al., "Opioid and nonopioid mechanisms of stress analgesia", Science 1980;208(4444):623-625.
Li, Changsheng, et al., "Stress induces pain transition by potentiation of AMPA receptor phosphorylation," J Neurosci 2014;34(41):13737-13746.
Li, Yi, et al., "LIMK-dependent actin polymerization in primary sensory neurons promotes the development of inflammatory heat hyperalgesia in rats", Sci Signal 2014;7(331):ra61.
Lin, Hui-Shan, et al., "Frailty and anesthesia—risks during and post-surgery," Local Reg Anesth 2018;11:61-73.
Luvisetto, S, et al., "Pain sensitivity in mice lacking the Ca(v)2.1 alpha1 subunit of P/Q-type Ca2+ channels", Neuroscience. Oct. 27, 2006; 142(3):823-32.
Maggi, Carlo Alberto, et al., "Neurochemical evidence for the involvement of N-type calcium channels in transmitter secretion from peripheral endings of sensory nerves in guinea pigs", Neuroscience letters 1990;114(2):203-206.
Maier, SF., "Stressor controllability and stress-induced analgesia", Ann NY Acad Sci. 1986;467:55-72.
Malenka Robert C., et al., "LTP and LTD: an embarrassment of riches," Neuron 2004;44(1):5-21.
Malmberg, Annika B. and Yaksh, Tony L., "Voltage-sensitive calcium channels in spinal nociceptive processing: blockade of N- and P-type channels inhibits formalin-induced nociception", JNeurosci 1994;14(8):4882-4890.
Manji, Hadi, "Neuropathy in HIV infection", Current opinion in neurology 2000;13(5):589-592.
Martenson, ME, et al., "A possible neural mechanism for photosensitivity in chronic pain", Pain. Apr. 2016; 157(4):868-78.
Martin, Laurent F., et al., "Evaluation of green light exposure on headache frequency and quality of life in migraine patients: A preliminary one-way cross-over clinical trial," Cephalalgia 2020:333102420956711.
Martin, Laurent F., et al., "Green light elicits anti-inflammation, endogenous opioid release and lessens synaptic potentiation to relieve post-surgical pain in elderly rats," Pain Journal.
Martin, Laurent, et al., "Green Light Exposure Improves Pain and Quality of Life in Fibromyalgia Patients: A Preliminary One-Way Crossover Clinical Trial," Pain Med 2020.

(56) References Cited

OTHER PUBLICATIONS

Martins, DF, et al., "Light-emitting diode therapy reduces persistent inflammatory pain: Role of interleukin 10 and antioxidant enzymes", Neuroscience. Jun. 2, 2016;324:485-95.
Maruyama, Hiroshi, et al., "Electrophysiological characterization of the tetrodotoxin-resistant Na+ channel, Na(v)1.9, in mouse dorsal root ganglion neurons", Pflugers Arch 2004;449(1):76-87.
Matthews, EA, et al., "The Cav2.3 calcium channel antagonist SNX-482 reduces dorsal horn neuronal responses in a rat model of chronic neuropathic pain", Eur J Neurosci. Jun. 2007;25(12):3561-9.
M'Dahoma, S, et al., "Effect of the T-type channel blocker KYS-05090S in mouse models of acute and neuropathic pain", Pflugers Arch. Feb. 2016;468(2): 193-9.
Mikheeva, I. B., et al., "Effect of Interleukin-10 on Localization of AMPA Receptors in Synapses during Long-Term Posttetanic Potentiation in Cultured Hippocampal Slices," Bull Exp Biol Med 2019;167(1):53-56.
Millan, M. J., et al., "A model of chronic pain in the rat: functional correlates of alterations in the activity of opioid systems," J Neurosci 1987;7(1):77-87.
Milligan, et al., "Intrathecal HIV-1 envelope glycoprotein gp120 induces enhanced pain states mediated by spinal cord proinflammatory cytokines", The Journal of neuroscience: the official journal of the Society for Neuroscience 2001;21(8):2808-2819.
Min, PK, et al., "830 nm light-emitting diode low level light therapy (LEDLLL T) enhances wound healing: a preliminary study", Laser Ther. 2013;22(1 ):43-9.
Mintz, Isabelle M., et al., "P-type calcium channels blocked by the spider toxin omega-Aga-IVA", Nature 1992;355(6363):827-829.
Moutal, A, et al., "(S)-lacosamide inhibition of CRMP2 phosphorylation reduces postoperative and neuropathic pain behaviors through distinct classes of sensory neurons identified by constellation pharmacology", Pain. Jul. 2016; 157(7): 1448-63.
Nascimento, FP, et al., "Adenosine A1 receptor-dependent antinociception induced by inosine in mice: pharmacological, genetic and biochemical aspects", Mal Neurobiol. 2015;51(3):1368-78.
Nesvizhskii, Alexey I., et al., "A statistical model for identifying proteins by tandem mass spectrometry", Anal Chem 2003;75(17):4646-4658.
Newcomb, Robert, et al., "Selective peptide antagonist of the class E calcium channel from the venom of the tarantula Hysterocrates gigas", Biochemistry 1998;37(44):15353-15362.
Niederhofer, H, et al., "Bright light treatment as add-on therapy for depression in 28 adolescents: a randomized trial", Prim Care Companion CNS Disord. 2011; 13(6).
Nir, Rony-Reuven, et al., "Color-selective photophobia in ictal vs interictal migraineurs and in healthy controls," Pain 2018;159(10):2030-2034.
Noseda, Rodrigo, et al., "Migraine photophobia originating in cone-driven retinal pathways," Brain 2016;139(Pt 7):1971-1986.
Nyberg, Michael A., et al., "Evaluation of donor corneal endothelial viability with the vital stains rose bengal and evans blue", Albrecht Von Graefes Arch Klin Exp Ophthalmol 1977;204(3):153-159.
Olmos, Gabriel, et al., "Tumor necrosis factor alpha: a link between neuroinflammation and excitotoxicity," Mediators Inflamm 2014;2014:861231.
Pascual, Olivier, et al., Microglia activation triggers astrocyte-mediated modulation of excitatory neurotransmission, Proc Natl Acad Sci U S A 2012;109(4):E197-205.
Pecze, Laszlo, et al., "Mechanism of capsaicin receptor TRPV1-mediated toxicity in pain-sensing neurons focusing on the effects of Na(+)/Ca(2+) fluxes and the Ca(2+)-binding protein calretinin", Biochimica et biophysica acta 2013;1833(7):1680-1691.
Pelegrini-Da-Silva, A, et al., "Angiotensin III modulates the nociceptive control mediated by the periaqueductal gray matter", Neuroscience. Dec. 15, 2009; 164(3): 1263-73.
Peranteau, William H., et al., "IL-10 overexpression decreases inflammatory mediators and promotes regenerative healing in an adult model of scar formation," J Invest Dermatol 2008;128(7):1852-1860.
Pereira, TS, et al., "Efficacy of red and infrared lasers in treatment of temporomandibular disorders—a double-blind, randomized, parallel clinical trial", Cranio. Jan. 2014;32(1 ):51-6.
Pihl, Tina Holberg, et al., "Serum amyloid A and haptoglobin concentrations in serum and peritoneal fluid of healthy horses and horses with acute abdominal pain", Vet Clin Pathol 2013;42(2):177-183.
Pogatzki-Zahn, Esther M., et al., "Postoperative pain-from mechanisms to treatment," Pain Rep 2017;2(2):e588.
Polgar, Erika, et al., "Expression of AMPA receptor subunits at synapses in laminae I-III of the rodent spinal dorsal horn," Mol Pain 2008;4:5.
Riedel, W., et al., "Nociception, pain, and antinociception: current concepts," Z Rheumatol 2001;60(6):404-415.
Roy, M., et al., "Differential properties of tetrodotoxin-sensitive and tetrodotoxin-resistant sodium channels in rat dorsal root ganglion neurons", The Journal of neuroscience: the official journal of the Society for Neuroscience 1992; 12(6):2104-2111.
Saegusa, H, et al., "Suppression of inflammatory and neuropathic pain symptoms in mice lacking the N-type Ca2+ channel", EMBO J. May 15, 2001;20(10):2349-56.
Salter, Michael W., et al., "Dysregulated Src upregulation of NMDA receptor activity: a common link in chronic pain and schizophrenia,". FEBS J 2012;279(1):2-11.
Sanada, Fumihiro, et al., "Source of Chronic Inflammation in Aging," Front Cardiovasc Med 2018;5:12.
Segal, Julia P., et al., "Circadian control of pain and neuroinflammation," J Neurosci Res 2018;96(6):1002-1020.
Shah, Kavita and Lahiri, Debomoy K, "A Tale of the Good and Bad: Remodeling of the Microtubule Network in the Brain by Cdk5", Mol Neurobiol 2016.
Shutov, L, et al., "The effect of nimodipine on calcium homeostasis and pain sensitivity in diabetic rats", Cell Mal Neurobiol. Oct.-Nov. 2006;26(7-8): 1541-57.
Smith, A. Ann and Friedemann, Marie-Luise, "Perceived family dynamics of persons with chronic pain", Journal of advanced nursing 1999;30(3):543-551.
Smith, FL, et al., "Calcium modulation of morphine analgesia: role of calcium channels and intracellular pool calcium", J Pharmacol Exp Ther. Jan. 1995;272(1 ):290-9.
Snutch, TP., "Targeting chronic and neuropathic pain: the N-type calcium channel comes of age", NeuroRx. Oct. 2005;2(4):662-70.
Sorge, Robert E., et al., "Different immune cells mediate mechanical pain hypersensitivity in male and female mice," Nat Neurosci 2015;18(8):1081-1083.
Spradley, JM, et al., "Effects of acute stressors on itch- and pain-related behaviors in rats", Pain. Sep. 2012; 153(9): 1890-7.
Streit, Wolfgang J., et al., "Microglia and neuroinflammation: a pathological perspective," J Neuroinflammation 2004;1(1):14.
Sun, Li, et al., "Microglial cathepsin B contributes to the initiation of peripheral inflammation-induced chronic pain", The Journal of neuroscience: the official journal of the Society for Neuroscience 2012;32(33):11330-11342.
Takahashi, M, et al., "The role of the catecholaminergic mechanism in foot shock (FS) stress- and immobilized-water immersion (IW) stress-sinduced analgesia in mice", Jpn J Pharmacol. Jun. 1984;35(2): 175-9.
Tao, Yuan-Xiang, "AMPA receptor trafficking in inflammation-induced dorsal horn central sensitization," Neurosci Bull 2012;28(2):111-120.
Terman, G.W., et al., "Opioid and non-opioid mechanisms of stress analgesia: lack of cross-tolerance between stressors", Brain Research, 260, 147-150, 1983.
Vandewalle, G., et al., "Wavelength-dependent modulation of brain responses to a working memory task by daytime light exposure," Cereb Cortex 2007;17(12):2788-2795.
Vivacqua G., et al., "Immunolocalization of alpha-synuclein in the rat spinal cord by two novel monoclonal antibodies", Neuroscience 2009;158(4):1478-1487.

(56) References Cited

OTHER PUBLICATIONS

Wang, Yun, et al., "Regulation of AMPA receptors in spinal nociception," Mol Pain 2010;6:5.

Wasserman, Ronald A., et al., "Characteristics of chronic pain patients who take opioids and persistently report high pain intensity," Reg Anesth Pain Med 2014;39(1):13-17.

Weiser, Thomas G., et al., "Size and distribution of the global volume of surgery in 2012," Bull World Health Organ 2016;94(3):201-209F.

Wen, Yeong-Ray, et al., "Activation of p38 mitogen-activated protein kinase in spinal microglia contributes to incision-induced mechanical allodynia," Anesthesiology 2009;110(1):155-165.

Wu, LinXin, et al., "The efficacy of N-methyl-D-aspartate receptor antagonists on improving the postoperative pain intensity and satisfaction after remifentanil-based anesthesia in adults: a meta-analysis," J Clin Anesth 2015;27(4):311-324.

Wu, Yuwen, et al., "Microglia: Dynamic Mediators of Synapse Development and Plasticity," Trends Immunol 2015;36(10):605-613.

Xu, Jun, et al., "Guarding pain and spontaneous activity of nociceptors after skin versus skin plus deep tissue incision," Anesthesiology 2010;112(1):153-164.

Yaksh, Tony L. and Rudy, Thomas A., "Chronic catheterization of the spinal subarachnoid space", Physiology & behavior 1976;17(6):1031-1036.

Yuan, Subo, et al., "Gp120 in the pathogenesis of human immunodeficiency virus-associated pain", Annals of neurology 2014;75(6):837-850.

Zahn, Peter K., et al., "Primary and secondary hyperalgesia in a rat model for human postoperative pain," Anesthesiology 1999;90(3):863-872.

Zamponi, GW, et al., "Role of voltage-gated calcium channels in ascending pain pathways", Brain Res Rev. Apr. 2009;60(1):84-9.

Zhan, Jinbiao, et al., "A fusion protein of conotoxin MVIIA and thioredoxin expressed in *Escherichia coli* has significant analgesic activity", Biochemical and biophysical research communications 2003;311(2):495-500.

Zhang, Xin, et al., "Positive feedback loop of autocrine BDNF from microglia causes prolonged microglia activation," Cell Physiol Biochem 2014;34(3):715-723.

Zhang, Yi, et al., "Identifying local and descending inputs for primary sensory neurons", The Journal of clinical investigation 2015;125(10):3782-3794.

Zhou, Jie, et al., "Spinal muscular atrophy associated with progressive myoclonic epilepsy is caused by mutations in ASAH1", Am J Hum Genet 2012;91(1):5-14.

Zulauf, Lars, et al., "Cofilin phosphorylation is involved in nitric oxide/cGMP-mediated nociception", Biochemical and biophysical research communications 2009;390(4):1408-1413.

Non Final Office Action for U.S. Appl. No. 18/292,183 issued Jan. 7, 2026 (18 pages).

Non Final Office Action for U.S. Appl. No. 18/292,268 issued Jan. 8, 2026 (22 pages).

Non Final Office Action for U.S. Appl. No. 18/292,287 issued Jan. 15, 2026 (18 pages).

Non Final Office Action for U.S. Appl. No. 18/292,236 issued Mar. 25, 2026 (19 pages).

Response to Non-Final Office Action filed in U.S. Appl. No. 18/292,287 on Apr. 14, 2026 (18 pages).

Response to Non-Final Office Action filed in U.S. Appl. No. 18/292,268 on Apr. 14, 2026 (14 pages).

Response to Non-Final Office Action filed in U.S. Appl. No. 18/292,236 on Apr. 14, 2026 (18 pages).

Response to Non-Final Office Action filed in U.S. Appl. No. 18/292,183 on Apr. 14, 2026 (17 pages).

* cited by examiner

Absorption Spectra of Various Plant Pigments Source

*chlorophyll a*
*chlorophyll b*
*beta-carotene*
*phycoerythrin*
*phycocyanin*
*allophycocyanin*
*fucoxanthin*

Absorbance 400
500
600
700

Wavelength (nm)

Figure 4B:
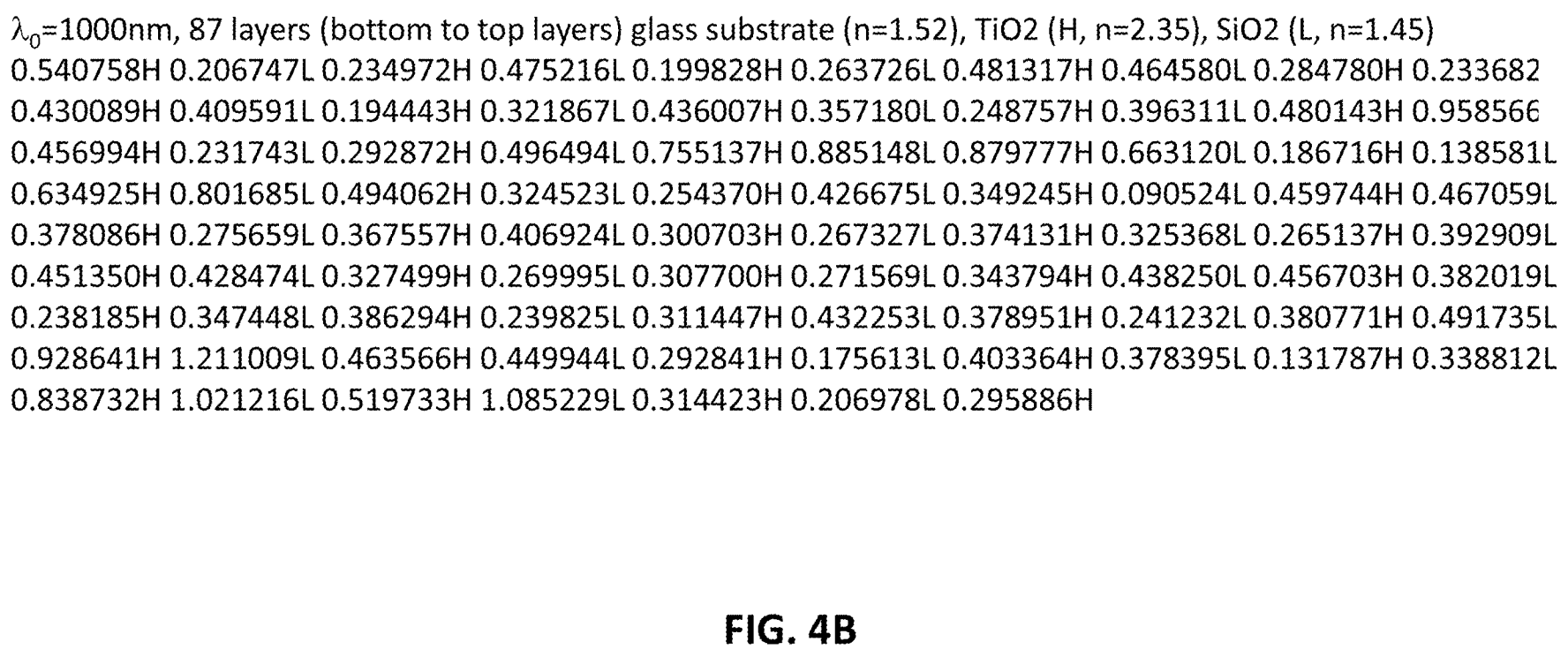

Solar Radiation Spectrum $\lambda_0$=1000nm, 87 layers (bottom to top layers) glass substrate (n=1.52), $TiO_2$ (H, n=2.35), $SiO_2$ (L, n=1.45)
0.540758H 0.206747L 0.234972H 0.475216L 0.199828H 0.263726L 0.481317H 0.464580L 0.284780H 0.233682
0.430089H 0.409591L 0.194443H 0.321867L 0.436007H 0.357180L 0.248757H 0.396311L 0.480143H 0.958566
0.456994H 0.231743L 0.292872H 0.496494L 0.755137H 0.885148L 0.879777H 0.663120L 0.186716H 0.138581L
0.634925H 0.801685L 0.494062H 0.324523L 0.254370H 0.426675L 0.349245H 0.090524L 0.459744H 0.467059L
0.378086H 0.275659L 0.367557H 0.406924L 0.300703H 0.267327L 0.374131H 0.325368L 0.265137H 0.392909L
0.451350H 0.428474L 0.327499H 0.269995L 0.307700H 0.271569L 0.343794H 0.438250L 0.456703H 0.382019L
0.238185H 0.347448L 0.386294H 0.239825L 0.311447H 0.432253L 0.378951H 0.241232L 0.380771H 0.491735L
0.928641H 1.211009L 0.463566H 0.449944L 0.292841H 0.175613L 0.403364H 0.378395L 0.131787H 0.338812L
0.838732H 1.021216L 0.519733H 1.085229L 0.314423H 0.206978L 0.295886H

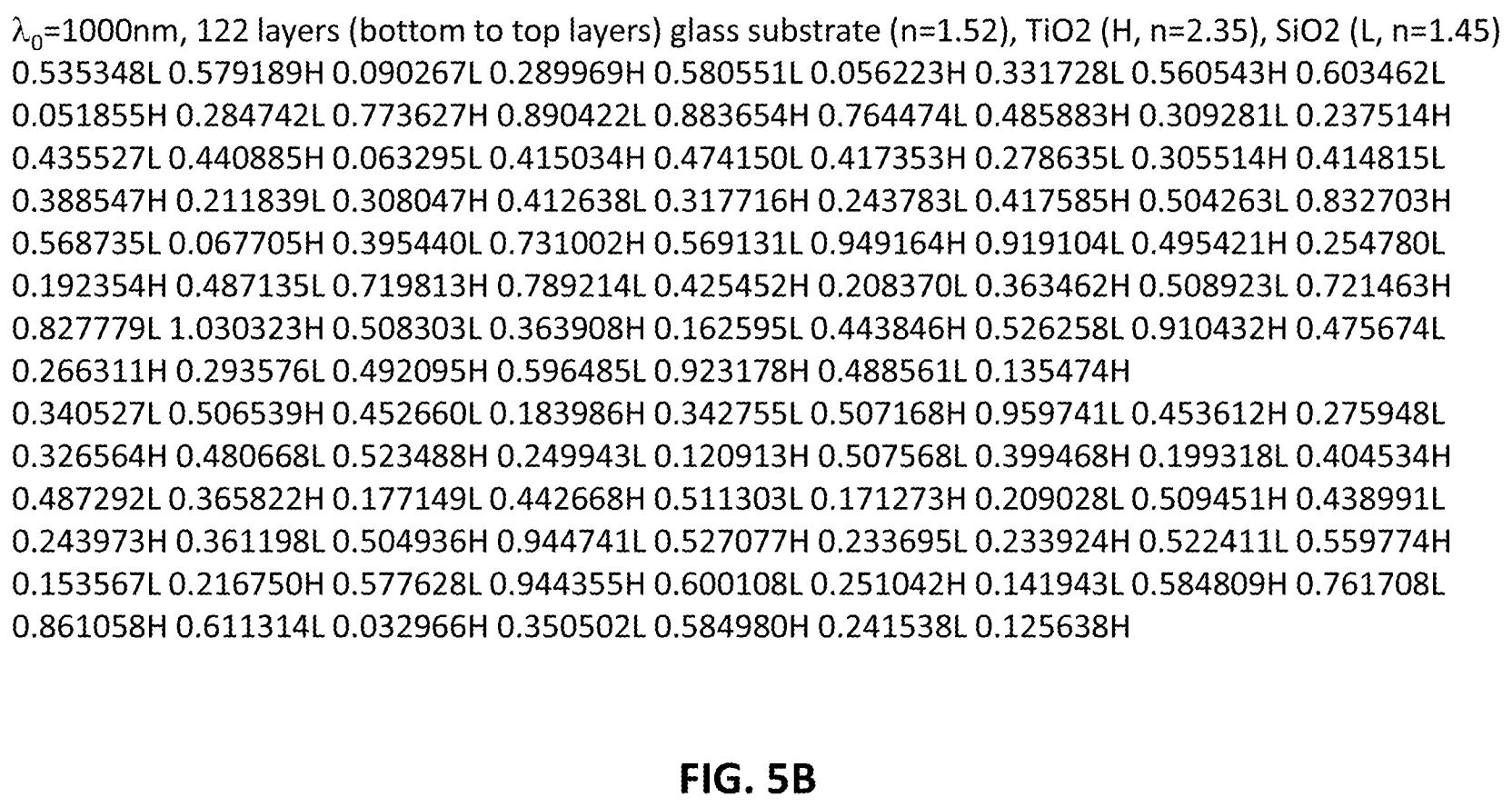

FIG. 4B $\lambda_0$=1000nm, 122 layers (bottom to top layers) glass substrate (n=1.52), $TiO_2$ (H, n=2.35), $SiO_2$ (L, n=1.45)
0.535348L 0.579189H 0.090267L 0.289969H 0.580551L 0.056223H 0.331728L 0.560543H 0.603462L
0.051855H 0.284742L 0.773627H 0.890422L 0.883654H 0.764474L 0.485883H 0.309281L 0.237514H
0.435527L 0.440885H 0.063295L 0.415034H 0.474150L 0.417353H 0.278635L 0.305514H 0.414815L
0.388547H 0.211839L 0.308047H 0.412638L 0.317716H 0.243783L 0.417585H 0.504263L 0.832703H
0.568735L 0.067705H 0.395440L 0.731002H 0.569131L 0.949164H 0.919104L 0.495421H 0.254780L
0.192354H 0.487135L 0.719813H 0.789214L 0.425452H 0.208370L 0.363462H 0.508923L 0.721463H
0.827779L 1.030323H 0.508303L 0.363908H 0.162595L 0.443846H 0.526258L 0.910432H 0.475674L
0.266311H 0.293576L 0.492095H 0.596485L 0.923178H 0.488561L 0.135474H
0.340527L 0.506539H 0.452660L 0.183986H 0.342755L 0.507168H 0.959741L 0.453612H 0.275948L
0.326564H 0.480668L 0.523488H 0.249943L 0.120913H 0.507568L 0.399468H 0.199318L 0.404534H
0.487292L 0.365822H 0.177149L 0.442668H 0.511303L 0.171273H 0.209028L 0.509451H 0.438991L
0.243973H 0.361198L 0.504936H 0.944741L 0.527077H 0.233695L 0.233924H 0.522411L 0.559774H
0.153567L 0.216750H 0.577628L 0.944355H 0.600108L 0.251042H 0.141943L 0.584809H 0.761708L
0.861058H 0.611314L 0.032966H 0.350502L 0.584980H 0.241538L 0.125638H

FIG. 5B

CIRCADIAN RHYTHM RESTORING BLUE BLOCKERS

CROSS-REFERENCE TO RELATED APPLICATION(S)

This patent document is a 371 National Stage Application of International Patent Application No. PCT/US2022/038207, filed Jul. 25, 2022, which claims priority to the provisional application with Ser. No. 63/225,727 titled "CIRCADIAN RHYTHM RESTORING BLUE BLOCKERS," filed Jul. 26, 2021. The entire contents of the above noted applications are incorporated by reference as part of the disclosure of this document.

TECHNICAL FIELD

The disclosed embodiments relate to eyewear and spectral filters.

SUMMARY

Methods and devices are described that, among providing other features and benefits, relate to spectral filters and associated eyewear that are specifically designed to mitigate the disruptive effects of electric lighting on the circadian clock that can cause sleep deprivation and other physiological and psychological maladies.

One example wearable device for viewing a real or virtual environment includes one or more windows positioned to allow light from the real or virtual environment to propagate toward a position where a wearer's eyes would be located, and a spectral filter that comprises a coating positioned on one or more sections of the one or more windows. The spectral filter includes a multi-layer stack of dielectric material with alternate high and low indices of refraction such that a layer having a high index of refraction is positioned above or below a layer having a low index of reflection, and a layer having a high index of refraction is positioned above or below a layer having a low index of reflection. The number of the layers and a thickness of each layer are selected to provide designed transmission and blocking characteristics to block circadian-rhythm-disruptive spectra from reaching the wearer's eyes while providing viewability of the real or virtual environment by allowing light outside of the circadian-rhythm-disruptive spectra to reach the wearer's eyes. The designed transmission and blocking characteristics include three contiguous blocking regions at 365-400 nm, 455-495 nm, and 530-560 nm bands of wavelengths, and three contiguous transmission regions at 405-450 nm (±5 nm), 497-528 nm (±2 nm) and 565-695 nm (±5 nm). The spectral filter is configured to block 80-100% of the spectral content in each of the contiguous blocking regions.

BRIEF DESCRIPTION OF THE DRAWINGS

FIG. 4B illustrates a set of parameters associated with the filter of FIG. 4A.

FIG. 5B illustrates a set of parameters associated with the filter of FIG. 5A.

DETAILED DESCRIPTION

The timing of the brain's circadian clock is set by schedules of natural sunlight exposure. All physiological processes in the body are synchronized to the signals sent from the brain's clock as it interprets these environmental light patterns. As such, the clock's estimation of whether it is daytime (presence of light) or nighttime (near absence of light) has widespread impacts on the timing and organization of the sleep-wake cycle. Electric room lighting can interfere with the circadian clock's estimation of day versus night because the photoreceptors in the eye that send information to the clock are activated by both natural sunlight and electric room lighting. Electric lighting can thus interfere with sleep because humans are most biologically prepared to sleep at night not during the day. If the clock interprets a daytime signal when sensing electric light, it will delay the timing of sleep and will have more difficulty communicating with the rest of the body so that a consolidated period of rest is coordinated at night.

The photoreceptors that transmit light information to the brain's clock are most sensitive to certain parts of the light spectrum. One photoreceptor, melanopsin, is expressed by a subpopulation of cells in the eye called intrinsically photosensitive retinal ganglion cells (ipRGCs). They are most activated by light occurring between 455-495 nm, which is perceived as "blue light." A second important photoreceptor that relays information to the clock is expressed by cone cells in the retina that are sensitive to mid-wavelength light occurring between 500-560 nm, which is perceived as "green light." Though blue and green light are only partial pieces of the overall visible spectrum (400-800 nm), they have outsized effects on how the brain's clock measures light exposure and interprets for itself and for the rest of the body the timing and length of the day versus the timing and length of the night.

The circuitry that comprises the brain's clock is different from the circuitry that comprises the image-forming visual system (i.e., the system that allows us to see). Current lens technologies that seek to limit the sleep-disrupting effects of electric lighting at night, take advantage of this segregation by filtering out all incident light below approximately 560 nm and allowing the rest through to enable visibility. This approach blocks about 50% of circadian-active light, while maintaining approximately 80% visibility.

Figure 1:
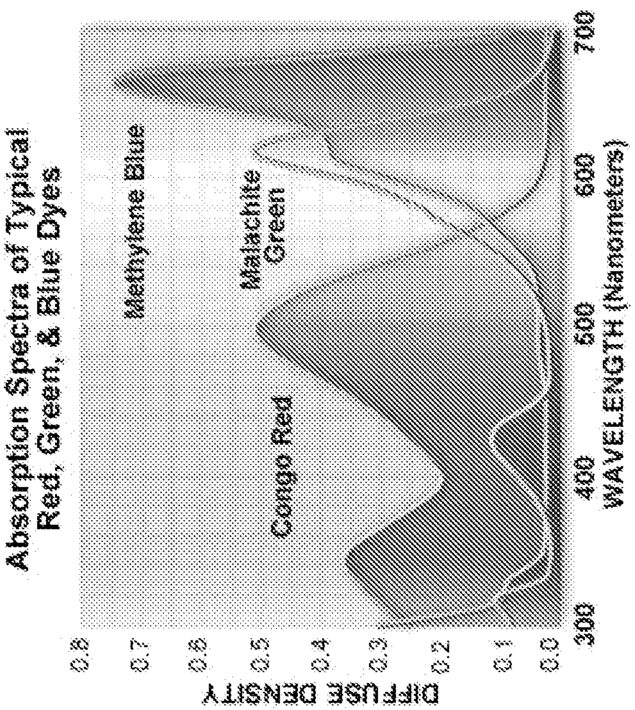
FIG. 1 illustrates example spectral characteristics of dye-based (left) and pigment-based (right) filters.

A large number of the existing systems, however, rely on dye- or pigment-based filters that block or transmit a contiguous band of wavelengths but without a capability to selectively transmit or block narrower subbands within the larger contiguous band. Dye and pigment filters operate based on absorption of light by color dye and pigment embedded in a material such as polymer or sol-gel. The transmission spectrum of this type of filter has broad peaks shaped like a Gaussian function with linewidth equal to the inhomogeneous broadening of the materials. FIG. 1 illustrates example spectral characteristics of dye-based (left) and pigment-based (right) filters that exhibit this type of behavior. As also evident from FIG. 1, each spectrum includes a prominent peak with gradual fall off characteristics on both sides thereof. Thus, the usefulness of these filters can be limited to applications where the desired spectral range happens to coincide with the spectral peak of the filter. But even then, the gradual falloff of the spectra can cause part of the desired spectrum to be filtered while allowing part of the undesired spectral content to seep through. In addition, the materials can be bleached under high light intensity, high temperature and/or corrosive environment.

Other types of filters include doped glass, semiconductor, metal, and metamaterial optical filters. Doped glass filters are made of a glass doped with a trace of impurity such as a metal and semiconductor nanocrystal, silver halides and cuprous ions. Semiconductor optical filters are made of semiconductor material with a transmission edge determined by the bandgap. Metal optical filters are made by depositing several layers of metal or metallic alloy made of rhodium, palladium, tungsten, nickel and chromium on a transparent substrate and are used extensively as neutral density filters. Metamaterial optical filters are made of micro- and nano-fabricated structures with dimensions of the order of or smaller than the operating wavelength. Another class of optical filters are tunable optical filters with transmission spectra that can be changed by temperature, electric and/or magnetic field. Examples of tunable optical filters are liquid crystal, Fabry-Perot and MEMS filters. These types of filters are generally bulky and have lower transmission than non-tunable filters.

The disclosed embodiments, among other features and benefits, rely on interference filter designs that are implemented in a wearable device (e.g., glasses, virtual reality goggles, etc.) or used as a covering for a luminaire (e.g., a light source from a house lamp) that provide a more precise and granular spectral behavior in that they allow specific spectral band or bands to be blocked and specific band or bands to be transmitted within a larger spectral bandwidth. The disclosed devices and methods can further allow other spectral bands that are completely blocked by some prior systems to be transmitted. Such a strategy, which would enhance visibility while restricting similar levels of circadian-active light, can be implemented by only blocking the most circadian-active blue and green light occurring between 455-495 and 530-560 nm. The result of this more precise targeting of circadian-active light is that about half the spectrum that is blocked by existing lens technology between 400-560 nm is freed up to improve visibility.

In some embodiments, the spectral content between 365 and 400 nm, the so-called ultraviolet-A (UVA) portion of the light spectrum, is removed. Humans express UVA-sensitive photoreceptors in the eye that could impact retinal function. Though UVA photoreceptors have yet to be definitively implicated in the workings of the brain's circadian clock, they can impact the clock function by impacting how the retina processes circadian-active light at 455-495 nm and 530-560 nm.

The disclosed embodiments rely on multi-layer dielectric interference filter configurations to enable the precise spectral shaping that is required for providing the circadian rhythm restoring characteristics while providing enhanced visibility. Multi-layer dielectric or dichroic filters operate by optical interference instead of absorption. These filters are made by depositing multiple layers of dielectric coating such as magnesium fluoride, zinc sulfide, cerium dioxide, titanium dioxide, silicon oxide, zirconium dioxide to name a few. Interference filters can be designed to transmit light of different wavelength band with sharp transmission edge, in contrast to the broad band spectrum of the dye and pigment filter. The transmission spectrum of this type of filter is generally dependent on the angle of the incident light, although designs can be made to minimize the angular variation.

Several types of interference filters are described that relate to the features of the disclosed embodiments: long-wave pass, short-wave pass, notch (minus, bandstop), and band pass interference filter. A long-wave pass interference filter can include a multilayer structure and can be described using the following shorthand notation:

$$\left[\frac{H}{2}L\frac{H}{2}\right]^S$$

In the above expression, H denotes a quarter-wave high-index layer having a thickness $\lambda_0/4n_H$ and $$\frac{H}{2}$$

denotes half of a quarter-wave high-index layer, i.e., one-eighth of a wave $\lambda_0/8\ n_H$. L denotes a quarter-wave low-index layer having a thickness $\lambda_0/4n_L$; s is an integer that denotes the number of basic periods (i.e., how many times the basis structure of high-low-high is repeated), $\lambda_0$ is the reference wavelength (i.e., the center wavelength used to design the filter), and $n_{H,L}$ represents the high or the low refractive index, depending on whether the H or L subscript is used. A short-wave pass interference filter can include a multilayer structure and can be described by the following notation that follows a similar convention as described above:

$$\left[\frac{L}{2}H\frac{L}{2}\right]^S$$

A bandpass filter is a combination of long-wave pass and short-wave pass filters, and allows only a particular spectral band (i.e., the passband) to be transmitted. A notch filter blocks a particular band of wavelengths (i.e., the notch) but allows the remaining spectral content to pass therethrough. A notch filter can be implemented by using a multilayer structure, represented by the following notation:

$$[\alpha L\ \beta H]^S\alpha L$$

In the above expression, α and β are numbers chosen for the location and width of the notch filter. For example, a notch filter with a reference wavelength at 550 nm and bandwidth of about 100 nm can be implemented using the multilayer structure represented by:

$$[1.68L\ 0.30H]^{59}1.68L$$

In the above example, $\alpha$=1.68 and $\beta$=0.30.

One key advantage of the disclosed embodiments is the selective transmission and blocking of different wavelengths of light to match the photo receptor sensitivity of the human retina with high efficiency that maintains a high visibility. To this end, the coating on the lens that is part of the eyewear is specifically designed to elicit a particular biological response. To meet these requirements, the optical lens with the coating must satisfy two efficiency conditions: transmission efficiency and illumination efficiency. The transmission efficiency of a color filter can be described as:

$$\eta_T = \frac{\int_{\lambda_1}^{\lambda_2} d\lambda T(\lambda)}{\int_{\lambda_3}^{\lambda_4} d\lambda T(\lambda)}$$

In the above expression, $\eta_T$ is the transmission efficiency; $\lambda_1$ and $\lambda_2$ are the lower and upper wavelengths, respectively, of the transmission band; $\lambda_3$ and $\lambda_4$ are the lower and upper wavelengths, respectively, of the incident illumination; and T($\lambda$) is the filter transmission spectrum. Interference filters with sharp transition edge and low transmission ripple are used to achieve high $\eta_T$.

In addition, the illumination efficiency of a color filter can be described as:

$$\eta_i = \frac{\int_{\lambda_1}^{\lambda_2} d\lambda S(\lambda) T(\lambda) \rho(\lambda)}{\int_{\lambda_3}^{\lambda_4} d\lambda S(\lambda) \rho(\lambda)}$$

Figures 2A, 2B:
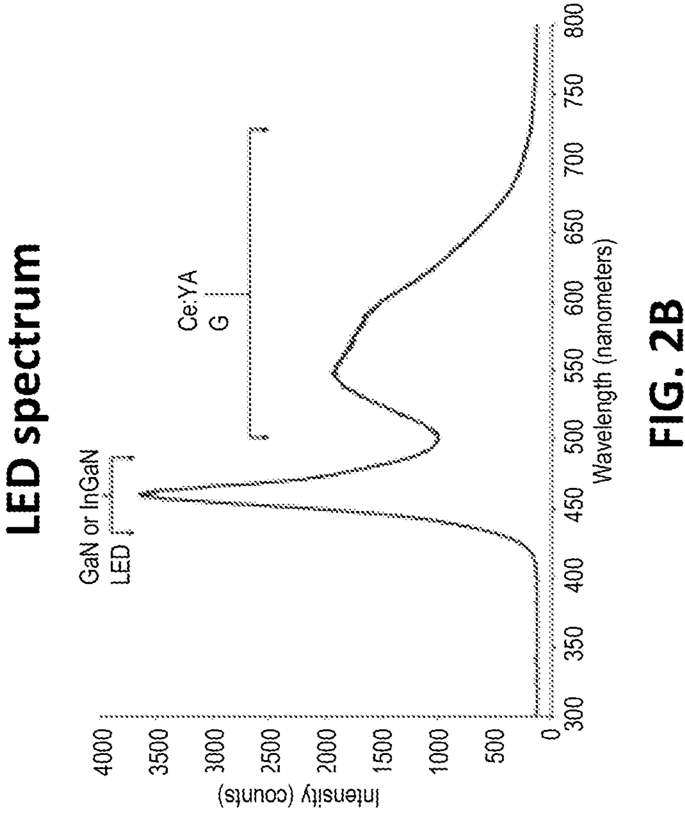
FIG. 2A illustrates the solar radiation spectrum.
FIG. 2B illustrates the radiation spectrum of an example light emitting diode (LED).
Figure 2C:
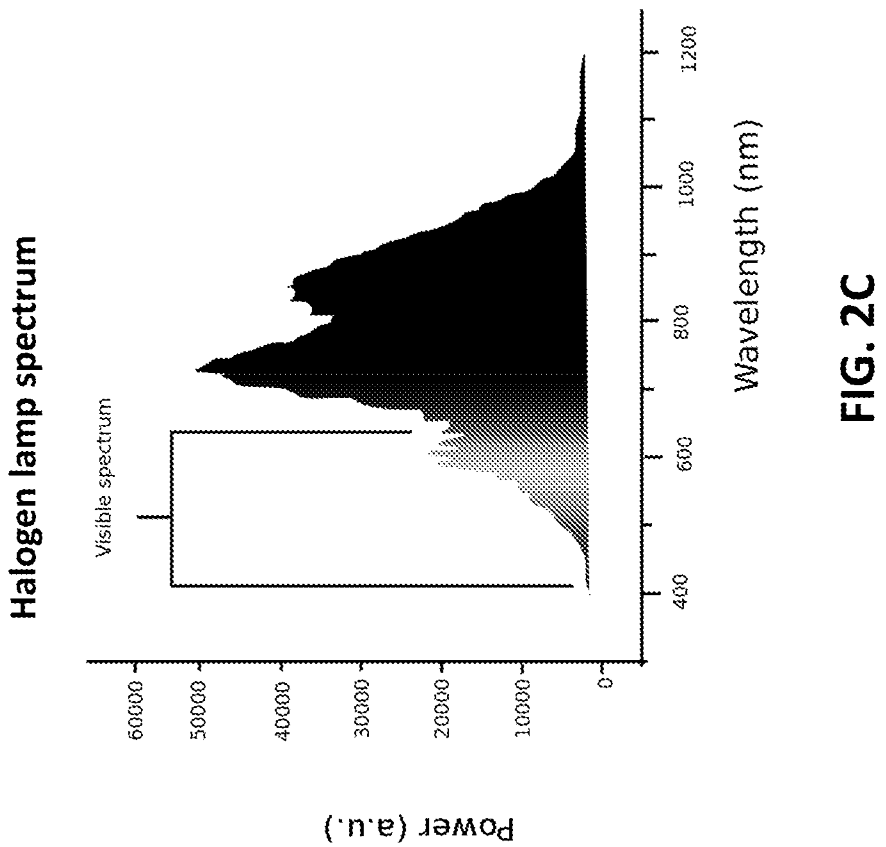
FIG. 2C illustrates the spectrum of an example halogen lamp.
Figure 3:
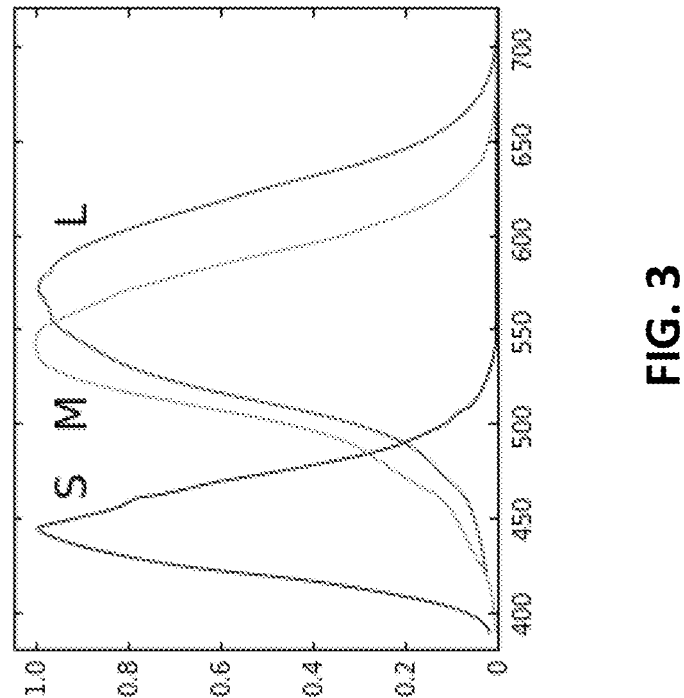
FIG. 3 illustrates a typical spectral sensitivity of the human eye.

In the above expression, $\eta_i$ is the illumination efficiency; $\lambda_1$ and $\lambda_2$ are the lower and upper wavelengths, respectively, of the transmission band; $\lambda_3$ and $\lambda_4$ are the lower and upper wavelengths, respectively, of the incident illumination; S($\lambda$) is the illumination spectrum; T($\lambda$) is the filter transmission spectrum; and $\rho(\lambda)$ is the human eye sensitivity. S($\lambda$) can be the spectrum of the sun, a light emitting diode (LED), a halogen lamp, a fluorescent lamp, or another source of illumination. Example spectra of some of the above sources are presented in FIGS. 2A to 2C. In particular, FIG. 2A illustrates the solar radiation spectrum; FIG. 2B illustrates the radiation spectrum of an example LED; and FIG. 2C illustrates the spectrum of an example halogen lamp. FIG. 3 illustrates a typical spectral sensitivity of the human eye, and in particular, the normalized responsivity spectra for S-, M- and L-cone cells. The illumination efficiency of the lens must be high so that light visibility is not critically reduced during day and night.

In some embodiments, the filter is part of a virtual reality and/or augmented reality system. In some embodiments, the filter is designed to be detachable and can be utilized as part of the system during different time of day.

Figure 4A:
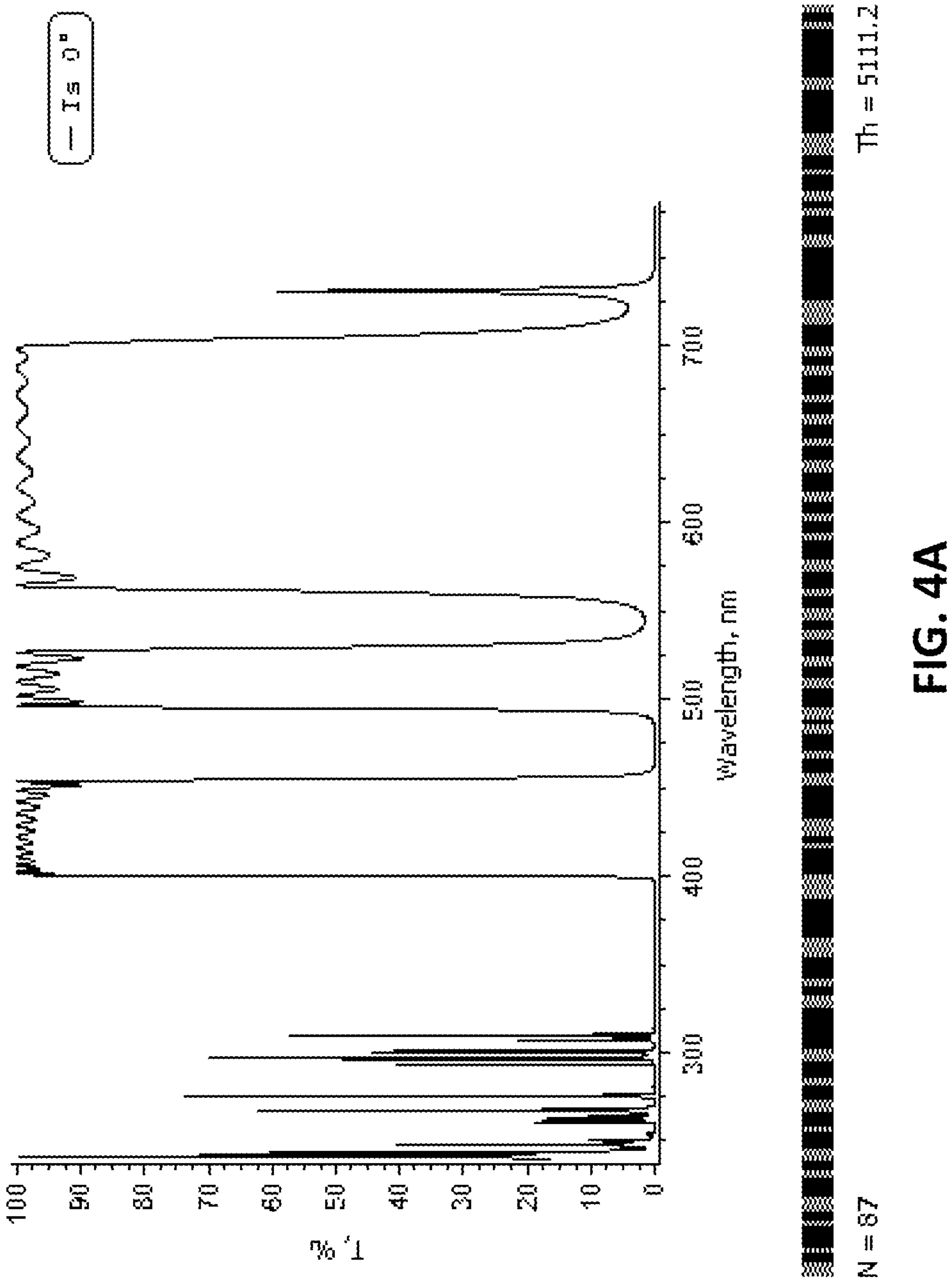
FIG. 4A is a plot of the transmission spectra for a filter specifically designed to restore circadian rhythm in accordance with an example embodiment.

FIG. 4A illustrates a plot of the transmission spectra for a filter specifically designed to restore circadian rhythm in accordance with an example embodiment. The filter in FIG. 4A blocks (i.e., at nearly 0% transmission) the following spectral bands: (1) 365-400 nm, (2) 455-495 nm, and (3) 530-560 nm, and allows very high transmission (in some embodiments, close to 100%) for spectral bands 405-450 nm (±5 nm), 497-528 nm (±2 nm) and 565-695 nm (±5 nm), as well as for the band above 700 nm. It should be also noted that the spectral tolerances (listed in parenthesis) are selected to block all, or almost all, of the green, blue and UV spectral content while allowing as much of the spectral content in the band 500-530 nm to be transmitted. As evident from the plots in FIG. 3, spectral sensitivities of the M and L cone types are highly responsive to the illumination in the 500-530 nm band, and thus illumination in this band improves the visibility and enhances the eye's ability to form images. The filter in FIG. 4A includes 87 dielectric layers stacked on top of a glass substrate (n=1.52), with high and low alternated layers that include $TiO_2$ (H, n=2.35) and $SiO_2$ (L, n=1.45), respectively. The thicknesses of the layers (using $\lambda_0$=1000 nm as the reference wavelength) are listed in FIG. 4B.

The transmission (or blockage) characteristics of the spectral bands can be modified by changing the number of layers in the design. For example, in some embodiments, the filter is designed to provide a blockage between 98-100%. In other filters, the blockage can be 95-98%. Yet in other designs, the blockage is 80-95%. In some example embodiments, the transmission is in the range 98-100%. Generally, the characteristics of the spectral bands can be fine-tuned by adding more layers to the design at the expense of increasing the cost of the filters.

Figure 5A:
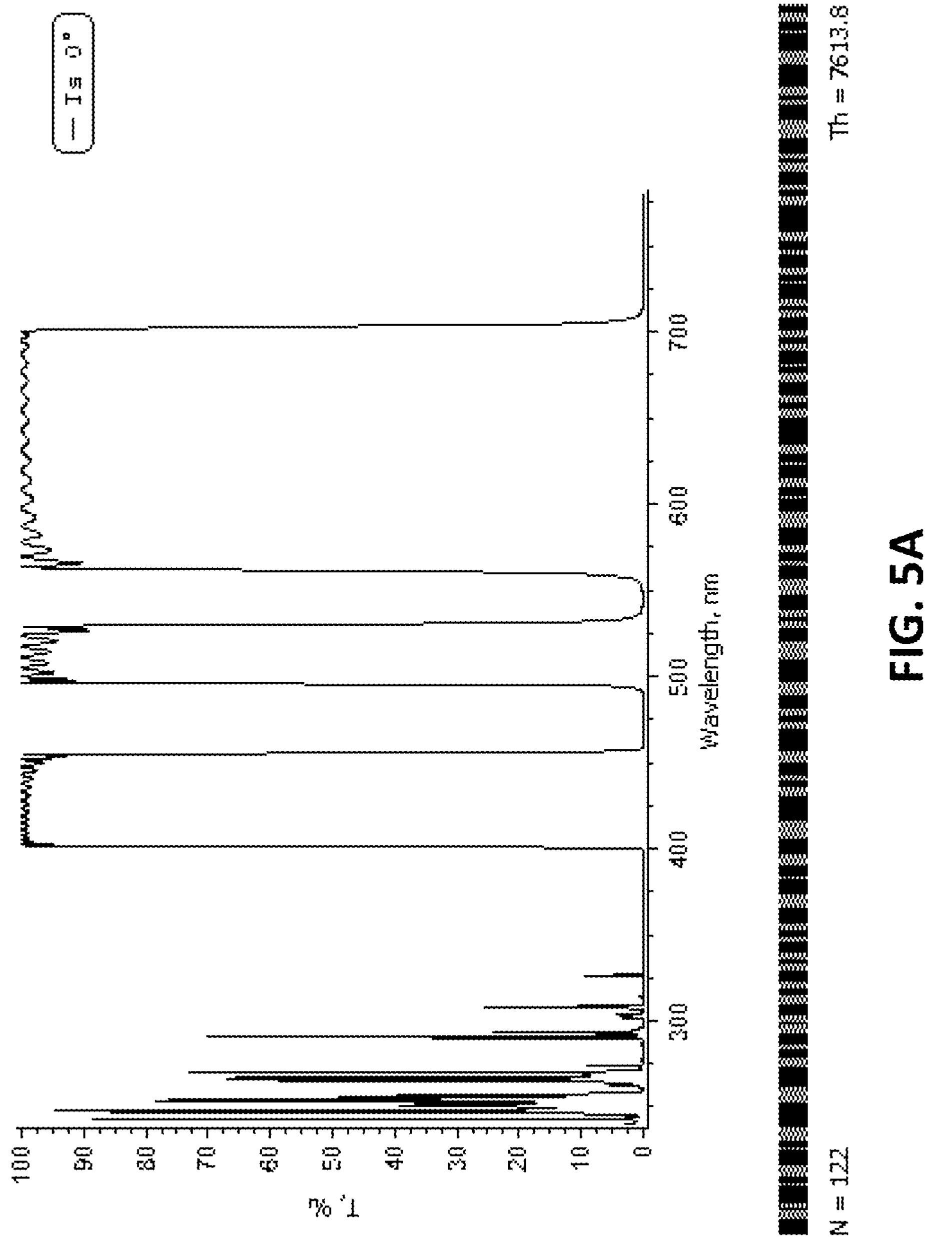
FIG. 5A is a plot of the transmission spectra for a filter specifically designed to restore circadian rhythm in accordance with another example embodiment.

FIG. 5A illustrates a plot of the transmission spectra for a filter specifically designed to restore circadian rhythm in accordance with an alternate embodiment. The filter in FIG. 5, similar to that in FIG. 4, blocks three spectral bands: (1) 365-400 nm, (2) 455-495 nm, and (3) 530-560 nm, and allows nearly full (in some embodiments 100%) transmission for spectral bands 405-450 nm (±5 nm), 497-528 nm (±2 nm) and 565-695 nm (±5 nm). In addition, the FIG. 5 filter blocks nearly all of the spectral ultraviolet spectrum (i.e., content below 400 nm), which has been associated with the incidence of several diseases of the eye. These characteristics are obtained by using 122 dielectric layers stacked on top of a glass substrate with thicknesses that are listed in FIG. 5B. While this design has more layers compared to the design in FIG. 4, it has less ripple and sharper transitions in the transmission spectrum, such that the transmission efficiency for this design is higher. In general, the cost of the filter increases with the number of layers of the filters, and there is a trade-off between cost and transmission efficiency.

Notably, both filters in FIGS. 4A and 5A block the circadian-active blue and green regions occurring in the bands 455-495 nm and 530-560 nm, while allowing nearly 100% transmission in the band 495-530 nm therebetween, and other pass bands such as the band 560-700 nm that are carved out with surgical precision. This added transmission capability in regions where the human eye is spectrally sensitive (see FIG. 3), provides added visibility of the scenes that are being viewed and improves the user experience in wearing the specialized glasses or goggles. In some embodiments, total light transmission is improved by 20-100%, depending on the source of illumination. In one embodiment, the filter allows nearly 50% more irradiance to reach the cornea under cloudy daylight conditions compared to existing designs. In contrast, other types of eyewear that rely on, for example, pigment or dye-based technologies, are often characterized by users to have poor visibility, especially at lowlight conditions such as at night or indoor environments. In addition, both designs in FIGS. 4A and 5A block the UVA region (between 365-400 nm), which as noted earlier, can contribute to the workings of the part of the retina that sends information to the brain's circadian clock. The filters in FIGS. 4A and 5A can also be designed to provide the spectral characteristics for a substrate that is different than glass. The filters may also include an anti-reflection coating on the back side.

Another feature of the disclosed filters is their ability to provide nearly optimum performance for all illumination sources with broadband or relatively broadband spectra. In particular, the filter passbands and notches are designed to precisely coincide with, and have sharp edges, in circadian-sensitive bands. Therefore, they provide optimum performance by only blocking out the portions of the illumination spectra responsible for disruptions in the circadian rhythm.

Figure 6:
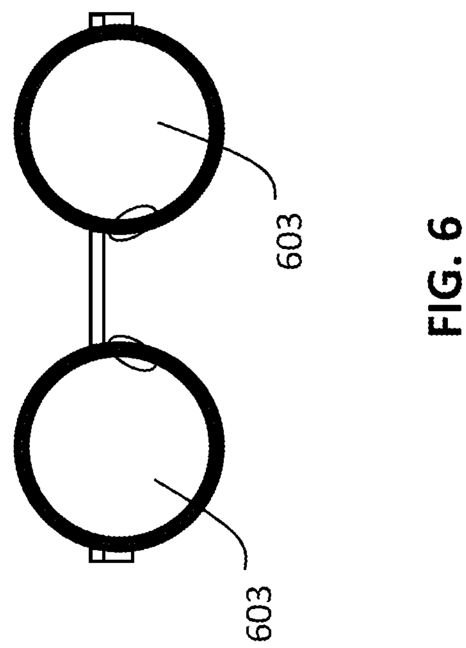
FIG. 6 illustrates an example eyewear that incorporates the circadian rhythm restoring filters of the disclosed technology.

FIG. 6 illustrates a pair of example glasses that includes a pair of lenses 603 that can be coated with the disclosed filters. In some implementations, the glasses can include opaque side shields or blocks (not shown) to prevent side illumination to reach the eye. In some implementations, the side shields can be transparent and include filters with similar transmission and blocking characteristic as those on the lenses 603. As noted earlier, the disclosed filters can be implemented as a coating provided on other types of eyewear, such as virtual reality goggles. For instance, the wearable device can include a unitary transparent window that can be coated uniformly, or at particular locations thereon, with the disclosed filters having transmission and blockage characteristics at precisely tailored bands of the spectrum. For example, the particular locations of coatings can be selected to affect light that reaches the user's eyes at approximately normal angles. In another example, the coatings' locations and areal extent can be chosen to filter the light that reaches the user's eyes at both normal and inclined angles. In yet another example, the filters can be made detachable to existing eye wear, for example by small magnets or by screw-in adapter.

One aspect of the disclosed technology relates to a wearable device for viewing a real or virtual environment that includes one or more windows positioned to allow light from the real or virtual environment to reach a wearer's eyes, and a spectral filter that comprises a coating positioned on one or more sections of the one or more windows. The spectral filter includes a multi-layer stack of dielectric material with alternate high and low indices of refraction such that a layer having a high index of refraction is positioned above or below a layer having a low index of reflection, and a layer having a high index of refraction is positioned above or below a layer having a low index of reflection. The number of the layers and thickness of each layer are selected to provide designed transmission and blocking characteristics to block circadian-rhythm-disruptive spectra from reaching the wearer's eyes while providing viewability of the real or virtual environment by allowing light outside of the circadian-rhythm-disruptive spectra to reach the wearer's eyes. The designed transmission and blocking characteristics include three contiguous blocking regions at 365-400 nm, 455-495 nm, and 530-560 nm bands of wavelengths, and three contiguous transmission regions at 405-450 nm band of wavelengths with a tolerance range of ±5 nm, 497-528 nm band of wavelengths with a tolerance range of ±2 nm and 565-695 nm band of wavelengths with a tolerance range of ±5 nm. The spectral filter is configured to block 80-100% of the spectral content in each of the contiguous blocking regions.

In one example embodiment, each of the contiguous transmission regions transmits 80-100% of the spectral content in the corresponding transmission region. In another example embodiment, the designed transmission and blocking characteristics include a blocking region that extends above 700 nm. In yet another example embodiment, the multi-layer stack includes 87 layers.

In another example embodiment, each layer with the high index of refraction includes titanium dioxide ($TiO_2$) and has a 2.35 index of refraction, and each layer with the low index of refraction includes silicon dioxide ($SiO_2$) and has a 1.45 index of refraction. In one example embodiment, the designed transmission and blocking characteristics include a blocking region that extends from 250 nm to 400 nm. In one configuration of the that embodiment, each layer with the high index of refraction includes titanium dioxide ($TiO_2$) and has a 2.35 index of refraction, and each layer with the low index of refraction includes silicon dioxide ($SiO_2$) and has a 1.45 index of refraction, and the multilayer stack includes 122 layers.

According to one example embodiment, the one or more windows include two lenses, and the spectral filter is formed as the coating on each of the lenses. In another example embodiment, the wearable device is a pair of goggles, the one or more windows form a unitary window, and the spectral filter is formed as the coating on the unitary window. In still another example embodiment, the wearable device is a pair of goggles, the one or more windows form a unitary window, and the spectral filter is formed as the coating on two or more sections of the unitary window. In yet another example embodiment, the wearable device is a pair of virtual reality goggles.

In another example embodiment, the one or more windows are made of glass or plastic. In one example embodiment, the spectral filter is removably attached to the one or more windows. In yet another example embodiment, the designed transmission and blocking characteristics produce optimum blockage of circadian-rhythm-disruptive light for broadband illumination or ambient lighting conditions.

Another aspect of the disclosed embodiments relates to a spectral filter for use in an eyewear for restoring circadian rhythm that incudes a multi-layer stack coating on a substrate. The multi-layer stack includes a plurality of layers of dielectric material with alternate high and low indices of refraction such that a layer having a high index of refraction is positioned above or below a layer having a low index of reflection, and a layer having a high index of refraction is positioned above or below a layer having a low index of reflection. The number of the layers and a thickness of each layer are selected to provide designed transmission and blocking characteristics to block circadian-rhythm-disruptive spectra from passing through the spectral filter. The designed transmission and blocking characteristics include three contiguous blocking regions at 365-400 nm, 455-495 nm, and 530-560 nm bands of wavelengths, and three contiguous transmission regions at 405-450 nm band of wavelengths with a tolerance range of ±5 nm, 497-528 nm band of wavelengths with a tolerance range of ±2 nm and 565-695 nm band of wavelengths with a tolerance range of ±5 nm. Each of the contiguous blocking regions blocks 80-100% of the spectral content in the corresponding blocking region, and each of the contiguous transmission regions transmits 98-100% of the spectral content in the corresponding transmission region.

In one example embodiment, the designed transmission and blocking characteristics include a blocking region that extends above 700 nm. In another example embodiment, each layer with the high index of refraction includes titanium dioxide ($TiO_2$) and has a 2.35 index of refraction, and each layer with the low index of refraction includes silicon dioxide ($SiO_2$) and has a 1.45 index of refraction. In yet another example embodiment, the designed transmission and blocking characteristics include a blocking region that extends from 250 nm to 400 nm. In still another example embodiment, each layer with the high index of refraction includes titanium dioxide ($TiO_2$) and has a 2.35 index of refraction, and each layer with the low index of refraction includes silicon dioxide ($SiO_2$) and has a 1.45 index of refraction, and the multilayer stack includes 122 layers. In another example embodiment, the multi-layer stack includes 87 layers.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

Only a few implementations and examples are described, and other implementations, enhancements and variations can be made based on what is described and illustrated in this patent document.

We claim:

1. A wearable device for viewing a real or virtual environment, comprising:

one or more windows positioned to allow light from the real or virtual environment to propagate toward a position of a wearer's eyes; and a spectral filter that comprises a coating positioned on one or more sections of the one or more windows, wherein the spectral filter includes a multi-layer stack of dielectric material with alternate high and low indices of refraction such that a layer having a high index of refraction is positioned above or below a layer having a low index of reflection, wherein a number of the layers and a thickness of each layer are selected to provide designed transmission and blocking characteristics to block circadian-rhythm-disruptive spectra from passing through the spectral filter while providing viewability of the real or virtual environment by allowing light outside of the circadian-rhythm-disruptive spectra to pass through the spectral filter, wherein the designed transmission and blocking characteristics include three contiguous blocking regions at 365-400 nm, 455-495 nm, and 530-560 nm bands of wavelengths, and three contiguous transmission regions at 405-450 nm band of wavelengths with a tolerance range of ±5 nm, 497-528 nm band of wavelengths with a tolerance range of ±2 nm and 565-695 nm band of wavelengths with a tolerance range of ±5 nm, and wherein the spectral filter is configured to block 80-100% of spectral content in each of the contiguous blocking regions.

2. The wearable device of claim 1, wherein each of the contiguous transmission regions transmits 80-100% of the spectral content in the corresponding transmission region.

3. The wearable device of claim 1, wherein the designed transmission and blocking characteristics include a blocking region that extends above 700 nm.

4. The wearable device of claim 3, wherein the multi-layer stack includes 87 layers.

5. The wearable device of claim 1, wherein:

each layer with the high index of refraction includes titanium dioxide ($TiO_2$) and has a 2.35 index of refraction, and each layer with the low index of refraction includes silicon dioxide ($SiO_2$) and has a 1.45 index of refraction.

6. The wearable device of claim 1, wherein the designed transmission and blocking characteristics include a blocking region that extends from 250 nm to 400 nm.

7. The wearable device of claim 6, wherein each layer with the high index of refraction includes titanium dioxide ($TiO_2$) and has a 2.35 index of refraction, and each layer with the low index of refraction includes silicon dioxide ($SiO_2$) and has a 1.45 index of refraction, and the multi-layer stack includes 122 layers.

8. The wearable device of claim 1, wherein the one or more windows include two lenses, and the spectral filter is formed as the coating on each of the lenses.

9. The wearable device of claim 1, wherein the wearable device is a pair of goggles, the one or more windows form a unitary window, and the spectral filter is formed as the coating on the unitary window.

10. The wearable device of claim 1, wherein the wearable device is a pair of goggles, the one or more windows form a unitary window, and the spectral filter is formed as the coating on two or more sections of the unitary window.

11. The wearable device of claim 1, wherein the wearable device is a pair of virtual reality goggles.

12. The wearable device of claim 1, wherein the one or more windows are made of glass or plastic.

13. The wearable device of claim 1, wherein the spectral filter is removably attached to the one or more windows.

14. The wearable device of claim 1, wherein the designed transmission and blocking characteristics produce optimum blockage of circadian-rhythm-disruptive light for broadband illumination or ambient lighting conditions.

15. A spectral filter for use in an eyewear for restoring circadian rhythm, comprising:

a multi-layer stack coating on a substrate, the multi-layer stack including a plurality of layers of dielectric material with alternate high and low indices of refraction such that a layer having a high index of refraction is positioned above or below a layer having a low index of reflection, wherein a number of the layers and a thickness of each layer are selected to provide designed transmission and blocking characteristics to block circadian-rhythm-disruptive spectra from passing through the spectral filter, wherein the designed transmission and blocking characteristics include three contiguous blocking regions at 365-400 nm, 455-495 nm, and 530-560 nm bands of wavelengths, and three contiguous transmission regions at 405-450 nm band of wavelengths with a tolerance range of ±5 nm, 497-528 nm band of wavelengths with a tolerance range of ±2 nm and 565-695 nm band of wavelengths with a tolerance range of ±5 nm, wherein each of the contiguous blocking regions blocks 80-100% of spectral content in the corresponding blocking region, and wherein each of the contiguous transmission regions transmits 98-100% of spectral content in the corresponding transmission region.

16. The spectral filter of claim 15, wherein the designed transmission and blocking characteristics include a blocking region that extends above 700 nm.

17. The spectral filter of claim 15, wherein each layer with the high index of refraction includes titanium dioxide ($TiO_2$) and has a 2.35 index of refraction, and each layer with the low index of refraction includes silicon dioxide ($SiO_2$) and has a 1.45 index of refraction.

18. The spectral filter of claim 15, wherein the designed transmission and blocking characteristics include a blocking region that extends from 250 nm to 400 nm.

19. The spectral filter of claim 18, wherein each layer with the high index of refraction includes titanium dioxide ($TiO_2$) and has a 2.35 index of refraction, and each layer with the low index of refraction includes silicon dioxide ($SiO_2$) and has a 1.45 index of refraction, and the multi-layer stack includes 122 layers.

20. The spectral filter of claim 15, wherein the designed transmission and blocking characteristics produce optimum blockage of circadian-rhythm-disruptive light for broadband illumination or ambient lighting conditions.

21. The spectral filter of claim 15, wherein the multi-layer stack includes 87 layers.

* * * * *